United States Patent
Matsushita et al.

(10) Patent No.: US 10,661,812 B2
(45) Date of Patent: May 26, 2020

(54) DISPLAY DEVICE

(71) Applicant: HONDA MOTOR CO., LTD., Minato-ku, Tokyo (JP)

(72) Inventors: Masanori Matsushita, Wako (JP); Hiroshi Tagami, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/053,876

(22) Filed: Aug. 3, 2018

(65) Prior Publication Data

US 2019/0047589 A1 Feb. 14, 2019

(30) Foreign Application Priority Data

Aug. 10, 2017 (JP) ................................. 2017-155160

(51) Int. Cl.
*B60W 50/14* (2020.01)
*B60W 20/13* (2016.01)
(Continued)

(52) U.S. Cl.
CPC ............. *B60W 50/14* (2013.01); *B60K 6/442* (2013.01); *B60K 35/00* (2013.01); *B60W 20/13* (2016.01); *B60K 6/485* (2013.01); *B60K 2006/4808* (2013.01); *B60K 2370/152* (2019.05); *B60L 2250/16* (2013.01); *B60R 16/0231* (2013.01); *B60W 2050/146* (2013.01)

(58) Field of Classification Search
None
See application file for complete search history.

(56) References Cited

U.S. PATENT DOCUMENTS

| 6,457,351 | B1 * | 10/2002 | Yamamoto | G01M 17/0072 73/116.05 |
| 10,099,681 | B2 * | 10/2018 | Eo | B60W 20/15 |

(Continued)

FOREIGN PATENT DOCUMENTS

| JP | 2007-118641 | 5/2007 |
| JP | 2012-126272 | 7/2012 |

(Continued)

OTHER PUBLICATIONS

Japanese Office Action for Japanese Patent Application No. 2017-155160 dated Jul. 2, 2019.

(Continued)

*Primary Examiner* — Fekadeselassie Girma
(74) *Attorney, Agent, or Firm* — Amin, Turocy & Watson, LLP

(57) ABSTRACT

A display device is a device mounted on a vehicle including an engine, and an electric motor connected to a drive wheel, the display device including: a display unit capable of displaying a predetermined image indicating that the engine operates; and a display control unit configured to cause the display unit to display the predetermined image when the engine operates with fuel consumption, in which, when regeneration by the electric motor is performed and an operation request for causing the engine to operate occurs, the display control unit causes the display unit to display the predetermined image regardless of an operation state of the engine.

6 Claims, 15 Drawing Sheets

(51) Int. Cl.
    *B60K 35/00* (2006.01)
    *B60K 6/442* (2007.10)
    *B60R 16/023* (2006.01)
    *B60K 6/485* (2007.10)
    *B60K 6/48* (2007.10)

(56) References Cited

U.S. PATENT DOCUMENTS

| | | | | |
|---|---|---|---|---|
| 10,328,927 B2* | 6/2019 | Okuji | ................... | B60K 35/00 |
| 2001/0020554 A1* | 9/2001 | Yanase | ................... | B60K 6/46 |
| | | | | 180/65.245 |
| 2010/0276494 A1* | 11/2010 | Yu | ................... | G06K 13/08 |
| | | | | 235/482 |
| 2010/0292902 A1* | 11/2010 | Bach | ................... | B60T 7/122 |
| | | | | 701/70 |
| 2011/0000725 A1* | 1/2011 | Murota | ................... | B60K 6/46 |
| | | | | 180/65.245 |
| 2011/0320088 A1* | 12/2011 | Eom | ................... | B60K 35/00 |
| | | | | 701/34.4 |
| 2014/0058579 A1* | 2/2014 | Ono | ................... | G06F 17/00 |
| | | | | 701/1 |
| 2014/0121956 A1* | 5/2014 | Jastrzebski | ................... | H01M 10/48 |
| | | | | 701/123 |
| 2014/0288751 A1* | 9/2014 | Shiogai | ................... | B60L 7/14 |
| | | | | 701/22 |
| 2015/0197162 A1* | 7/2015 | Martin | ................... | B60L 11/1861 |
| | | | | 701/22 |
| 2015/0224995 A1* | 8/2015 | Yamaoka | ................... | B60W 40/107 |
| | | | | 702/141 |
| 2015/0233304 A1* | 8/2015 | Hara | ................... | B60W 20/00 |
| | | | | 701/22 |
| 2016/0207520 A1* | 7/2016 | Mizushima | ................... | B60K 6/48 |
| 2016/0368473 A1* | 12/2016 | Matsushita | ................... | B60W 20/10 |
| 2017/0015328 A1* | 1/2017 | Oguri | ................... | B60W 50/0097 |
| 2017/0067385 A1* | 3/2017 | Hunt | ................... | F02D 41/029 |
| 2018/0009329 A1* | 1/2018 | Tellez | ................... | B60L 1/00 |
| 2018/0238251 A1* | 8/2018 | Sammer | ................... | F01N 9/002 |
| 2018/0274673 A1* | 9/2018 | Sugai | ................... | F01N 3/035 |
| 2018/0340785 A1* | 11/2018 | Upadhyay | ................... | G01C 21/3484 |

FOREIGN PATENT DOCUMENTS

| | | |
|---|---|---|
| JP | 2017-095048 | 6/2017 |
| WO | 2011/030444 | 3/2011 |
| WO | 2011/158318 | 12/2011 |
| WO | 2013/021450 | 2/2013 |
| WO | 2015/040729 | 3/2015 |

OTHER PUBLICATIONS

Japanese Notice of Allowance for Japanese Patent Application No. 2017-155160 dated Jan. 14, 2020.

* cited by examiner

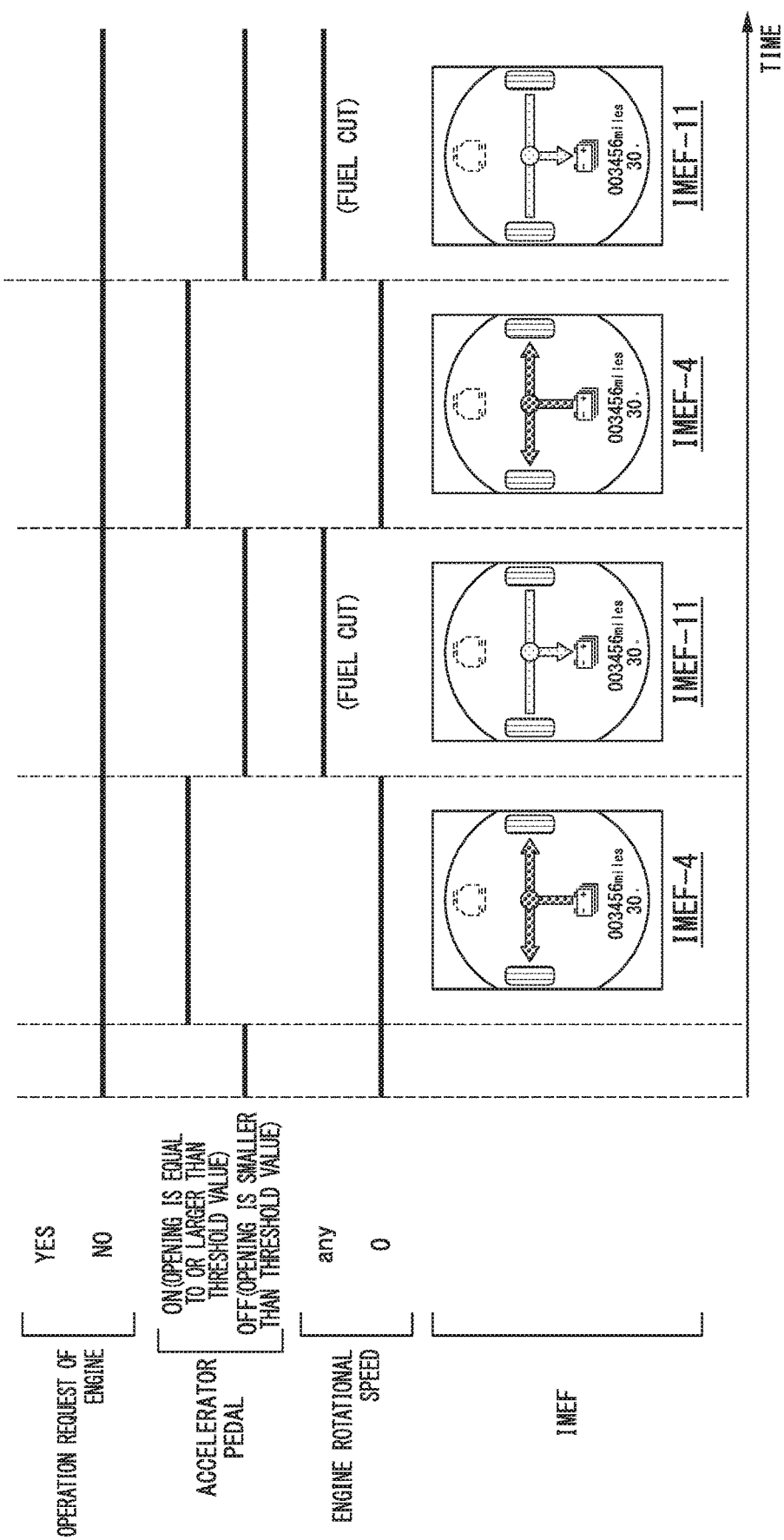

DISPLAY DEVICE

CROSS-REFERENCE TO RELATED APPLICATION

Priority is claimed on Japanese Patent Application No. 2017-155160, filed on Aug. 10, 2017, the content of which is incorporated herein by reference.

BACKGROUND

Field of the Invention

The present invention relates to a display device.

Background

A hybrid vehicle including an engine and a traveling motor is wide spread. In at least some of hybrid vehicles, a flow of energy flowing among an engine, a motor, a battery, and the like is displayed on a display device provided in an instrument panel and the like (for example, refer to Japanese Unexamined Patent Application, First Publication No. 2017-95048). The content of such a display may be referred to as an energy flow.

SUMMARY

In a hybrid vehicle, together with or instead of an energy flow, an occupant may be informed whether or not an engine or motor operates by turning on or off an image such as an icon. However, in a conventional technology, the image may flicker depending on control circumstances in a vehicle in some cases.

An object of an aspect of the present invention is to provide a display device capable of suppressing occurrence of flickering of an image.

(1) An aspect of the present invention is a display device which is mounted on a vehicle including an engine, and an electric motor connected to a drive wheel, the display device including: a display unit capable of displaying a predetermined image indicating that the engine operates; and a display control unit configured to cause the display unit to display the predetermined image when the engine operates with fuel consumption, in which, when regeneration by the electric motor is performed and an operation request for causing the engine to operate occurs, the display control unit causes the display unit to display the predetermined image regardless of an operation state of the engine.

(2) In the display device described in (1), the operation request may include an operation request other than an operation request based on an operation for an operator receiving an acceleration instruction from a driver.

(3) In the display device described in (1) or (2), the vehicle may further include a generator connected to the engine, and, when regeneration by the electric motor is performed, an operation request for causing the engine to operate occurs, and regeneration electric power by the electric motor is consumed by the generator causing the engine to operate without depending on fuel, the display control unit may cause the display unit to display the predetermined image.

(4) In the display device described in any of (1) to (3), when an operation request for causing the engine to operate disappears while the predetermined image is displayed on the display unit, the display control unit may determine whether or not to stop causing the display unit to display the predetermined image based on the operation state of the engine.

(5) A display device according to another aspect of the present invention includes: a display unit which is mounted on a vehicle and is capable of displaying a predetermined image indicating that at least one driving source of the vehicle operates; and a display control unit configured to determine whether or not to cause the display unit to display the predetermined image in accordance with an operation state of the driving source, in which, when the operation state of the driving source is switched, the display control unit determines whether or not to cause the display unit to continue displaying the predetermined image in accordance with an operation state of the driving source at least immediately before the switching.

(6) In the display device described in (5), the driving source may include an engine, an electric motor connected to a drive wheel, a generator connected to the engine, and a battery, the predetermined image may be an image indicating that the engine operates, the operation state of the driving source may include a first state in which the engine operates with fuel consumption, a second state in which the engine stops and regeneration electric power by the electric motor is stored in the battery, and a third state in which the engine stops and regeneration electric power by the electric motor is consumed by the generator causing the engine to operate without depending on fuel, in which, when the operation state of the driving source is switched among the first state, the second state, and the third state, the display control unit may determine whether or not to cause the display unit to continue displaying the predetermined image in accordance with an operation state of the driving source at least immediately before the switching.

(7) In the display device described in (6), when the operation state of the driving source is switched from the first state to the third state, the display control unit may cause the display unit to continue displaying the predetermined image.

(8) In the display device described in (6) or (7), when the operation state of the driving source is switched from the second state to the third state, the display control unit may cause the display unit to continue a state of not displaying the predetermined image. According to the display device according to (1) to (8) described above, it is possible to suppress occurrence of flickering of images.

BRIEF DESCRIPTION OF THE DRAWINGS

FIG. 12 is a diagram which shows changes in display state when an acceleration instruction and a deceleration instruction are repeated in the EV traveling mode in which an operation request of an engine does not occur.

DESCRIPTION OF THE EMBODIMENTS

Hereinafter, embodiments of a display device of the present invention will be described with reference to drawings.

[Overall Configuration]

Figure 1:
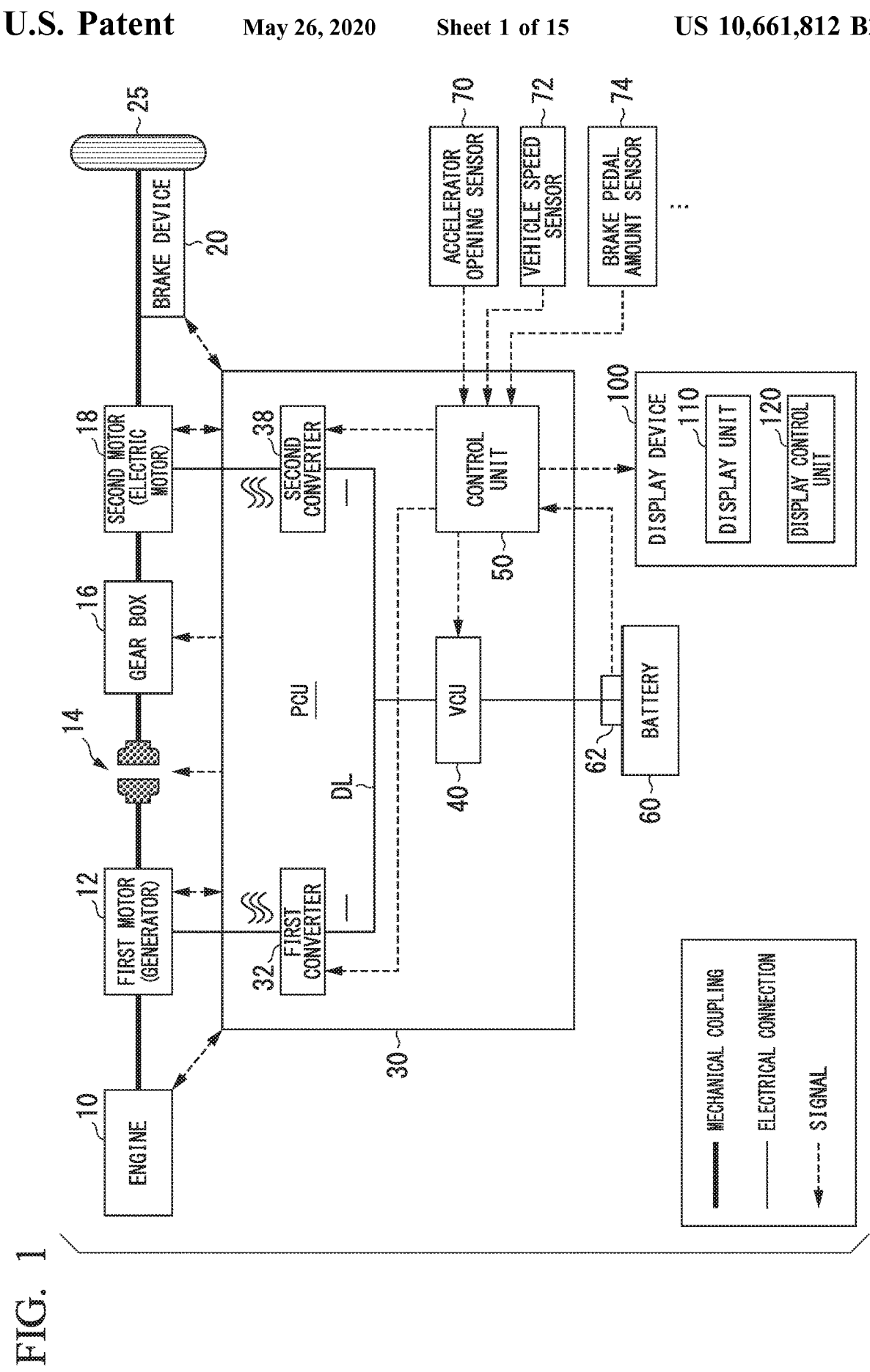
FIG. 1 is a diagram which shows an example of a configuration of a vehicle on which a display device is mounted.

FIG. 1 is a diagram which shows an example of a configuration of a vehicle on which a display device 100 is mounted. The vehicle of the configuration shown in FIG. 1 is a hybrid vehicle capable of switching a series method and a parallel method. The series method is a method in which an engine and a drive wheel are not mechanically connected, the power of an engine is exclusively used for power generation by a generator, and generated electric power is supplied to an electric motor for traveling. The parallel method is a method in which an engine and a drive wheel can be mechanically (or via a fluid such as a torque converter) connected, and power of the engine can be transmitted to the drive wheel or used for power generation. In the vehicle configured as shown in FIG. 1, it is possible to switch between the series method and the parallel method by connecting to or disconnecting from the lock-up clutch 14. Note that the display device 100 can be mounted on a hybrid vehicle using the series method and can be mounted on a hybrid vehicle using the parallel method. In addition, this vehicle may be a vehicle with a plug-in chargeable battery.

As shown in FIG. 1, the vehicle includes, for example, an engine 10, a first motor (generator) 12, a lock-up clutch 14, a gear box 16, a second motor (electric motor) 18, a brake device 20, a drive wheel 25, a power control unit (PCU) 30, a battery 60, a battery sensor 62 such as a voltage sensor, a current sensor, or a temperature sensor, vehicle sensors such as an accelerator opening sensor 70, a vehicle speed sensor 72, and a brake pedal amount sensor 74, and a display device 100 which are mounted thereon. This vehicle includes at least the engine 10, the second motor 18, and the battery 60 as driving sources.

The engine 10 is an internal combustion engine that outputs power by burning fuel such as gasoline. The engine 10 is a reciprocating engine which includes, for example, a cylinder and a piston, an intake valve, an exhaust valve, a fuel injection device, a spark plug, a connection rod, a crankshaft, and the like. In addition, the engine 10 may be a rotary engine.

The first motor 12 is, for example, a three-phase alternating current generator. The first motor 12 has a rotor connected to an output axis of the engine 10 (or example, crankshaft) and generates power using power output by the engine 10. The output axis of the engine 10 and the rotor of the first motor 12 are connected to a side of the drive wheel 25 via the lock-up clutch 14.

The lock-up clutch 14, in accordance with an instruction from the PCU 30, switches between a state in which an output axis of the engine 10 and the rotor of the first motor 12 are connected to the side of the drive wheel 25 (hereinafter, a connected state) and a state in which they are disconnected from the side of the drive wheel 25 (hereinafter, a separated state).

The gear box 16 is a transmission. The gear box 16 changes a speed of power output by the engine 10 and transmits it to the side of the drive wheel 25. A gear ratio of the gear box 16 is designated by the PCU 30.

The second motor 18 is, for example, a three-phase alternating current electric motor. A rotor of the second motor 18 is connected to the drive wheel 25. The second motor 18 outputs power to the drive wheel 25 using supplied electric power. In addition, the second motor 18 generates power using kinetic energy of the vehicle. In the following description, a power generation operation by the second motor 18 may be referred to as regeneration in some cases.

The brake device 20 includes, for example, a brake caliper, a cylinder for transmitting a hydraulic pressure to the brake caliper, and an electric motor for generating the hydraulic pressure in the cylinder. The brake device 20 may include a mechanism for transmitting a hydraulic pressure generated by an operation of the brake pedal to the cylinder via a master cylinder as a backup. The brake device 20 is not limited to have the configuration described above, and may also be an electronically controlled hydraulic pressure brake device which transmits a hydraulic pressure of the master cylinder to the cylinder.

The PCU 30 includes, for example, a first converter 32, a second converter 38, a voltage control unit (VCU) 40, and a control unit 50. It is merely an example that these configuration elements are formed as one unit as the PCU 30, and these configuration elements may also be arranged in a distributed manner.

The first converter 32 and the second converter 38 are, for example, AC-DC converters. Direct current side terminals of the first converter 32 and the second converter 38 are connected to a DC link DL. The DC link DL is connected to the battery 60 via the VCU 40. The first converter 32 converts an alternating current power generated by the first motor 12 into a direct current and outputs it to the DC link DL, or converts a direct current supplied via the DC link DL into an alternating current and supplies it to the first motor 12. In the same manner, the second converter 38 converts an alternating current power generated by the second motor 18 into a direct current and outputs it to the DC link DL, or converts the direct current supplied via the DC link DL into an alternating current and supplies it to the second motor 18.

The VCU 40 is, for example, a DC-DC converter. The VCU 40 boosts electric power supplied from the battery 60 and outputs it to the DC link DL.

Functions of the control unit 50 will be described below. The battery 60 is, for example, a secondary battery such as a lithium-ion battery.

The accelerator opening sensor 70 is attached to an accelerator pedal which is an example of an operator for receiving an acceleration instruction made by a driver, detects an operation amount of the accelerator pedal, and outputs it to the control unit 50 as an accelerator opening. The vehicle speed sensor 72 includes, for example, a wheel speed sensor attached to each wheel, and a speed calculator, derives a speed of the vehicle (a vehicle speed) by integrating wheel speeds detected by the wheel speed sensor, and outputs it to the control unit 50. The brake pedal amount sensor 74 is attached to a brake pedal which is an example of an operator for receiving a deceleration or stop instruction made by a driver, detects an operation amount of the brake pedal, and outputs it to the control unit 50 as a brake pedal amount.

The display device 100 will be described after the control unit 50.

Figure 2:
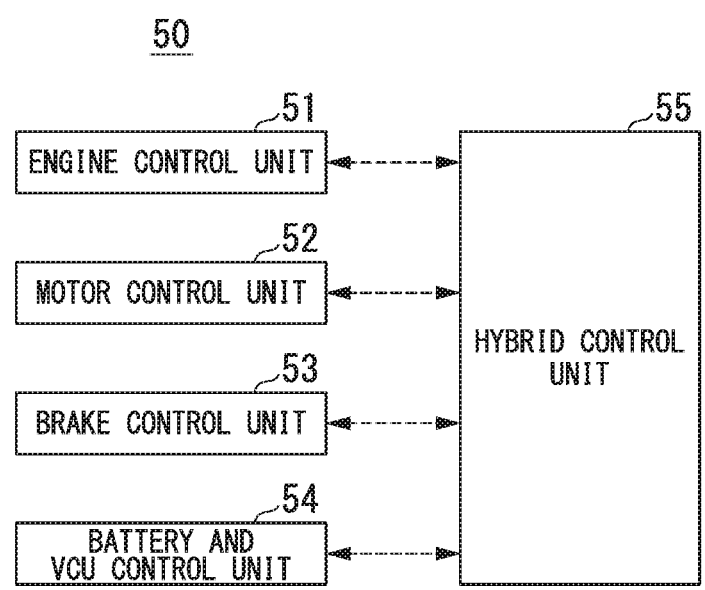
FIG. 2 is a diagram which shows an example of a functional configuration of a control unit.

FIG. 2 is a diagram which shows an example of a functional configuration of a control unit 50. The control unit 50 includes, for example, an engine control unit 51, a motor control unit 52, a brake control unit 53, a battery and VCU control unit 54, and a hybrid control unit 55. These configuration elements are realized by a hardware processor such as a central processing unit (CPU) executing a program (software). In addition, part or all of these configuration elements may be realized by hardware (a circuit section; including circuitry) such as a large scale integration (LSI), an application specific integrated circuit (ASIC), a field-programmable gate array (FPGA), and a graphics processing unit (GPU), and may also be realized by cooperation of software and hardware.

In addition, each of the engine control unit 51, the motor control unit 52, the brake control unit 53, and the battery and VCU control unit 54 may also be replaced with a control device separated from the hybrid control unit 55, for example, a control device such as an engine electronic control unit (ECU), a motor ECU, a brake ECU, or a battery ECU.

The engine control unit 51 performs ignition control, throttle opening control, fuel injection control, fuel cut control, and the like of the engine 10 in accordance with an instruction from the hybrid control unit 55. Moreover, the engine control unit 51 may calculate an engine rotational speed on the basis of an output of a crank angle sensor attached to the crankshaft and output it to the hybrid control unit 55.

The motor control unit 52 performs switching control of the first converter 32 and/or the second converter 38 in accordance with an instruction from the hybrid control unit 55.

The brake control unit 53 controls the brake device 20 in accordance with an instruction from the hybrid control unit 55.

The battery and VCU control unit 54 calculates a state of charge (SOC; a charging rate) of the battery 60 on the basis of an output of the battery sensor 62 attached to the battery 60 and outputs it to the hybrid control unit 55. In addition, the battery and VCU control unit 54 causes the VCU 40 to operate in accordance with an instruction from the hybrid control unit 55 and raises a voltage of the DC link DL.

The hybrid control unit 55 determines a traveling mode on the basis of outputs of the accelerator opening sensor 70, the vehicle speed sensor 72, and the brake pedal amount sensor 74, and outputs instructions to the engine control unit 51, the motor control unit 52, the brake control unit 53, and the battery and VCU control unit 54 in accordance with a traveling mode.

[Various Types of Traveling Mode]

Hereinafter, a traveling mode determined by the hybrid control unit 55 will be described. The traveling mode includes the following modes.

(1) EV Traveling Mode (EV)

In an EV traveling mode, the hybrid control unit 55 brings the lock-up clutch 14 into a separated state, drives the second motor 18 using electric power supplied from the battery 60, and causes the vehicle to travel according to power from the second motor 18.

(2) Series Hybrid Traveling Mode (ECVT)

In a series hybrid traveling mode, the hybrid control unit 55 sets the lock-up clutch 14 to the separated state, causes the engine 10 to operate by supplying fuel thereto, and supplies electric power generated by the first motor 12 to the battery 60 and the second motor 18. Then, the second motor 18 is driven using electric power supplied from the first motor 12 or the battery 60, and the vehicle is caused to travel using power from the second motor 18.

(3) Engine Drive Traveling Mode (LU)

In an engine drive traveling mode, the hybrid control unit 55 sets the lock-up clutch 14 to the connected state, causes the engine 10 to operate by consuming fuel, and causes the vehicle to travel by transmitting at least part of the power output by the engine 10 to the drive wheel 25. At this time, the first motor 12 may or may not perform power generation. In addition, when the power that is output by the engine 10 is insufficient, the second motor 18 may or may not output an amount of power that supplies the shortfall to the drive wheel 25. The engine drive traveling mode is used to realize a parallel method. The engine drive traveling mode is adopted when the speed of the vehicle is within a predetermined range of the engine 10 with good operation efficiency.

(4) Regeneration

At the time of regeneration, the hybrid control unit 55 sets the lock-up clutch 14 to the separated state and causes the second motor 18 to perform power generation using the kinetic energy of the vehicle. Generated electric power at the time of regeneration is stored in the battery 60, or discarded by a waste electricity operation as described below.

Figure 3:
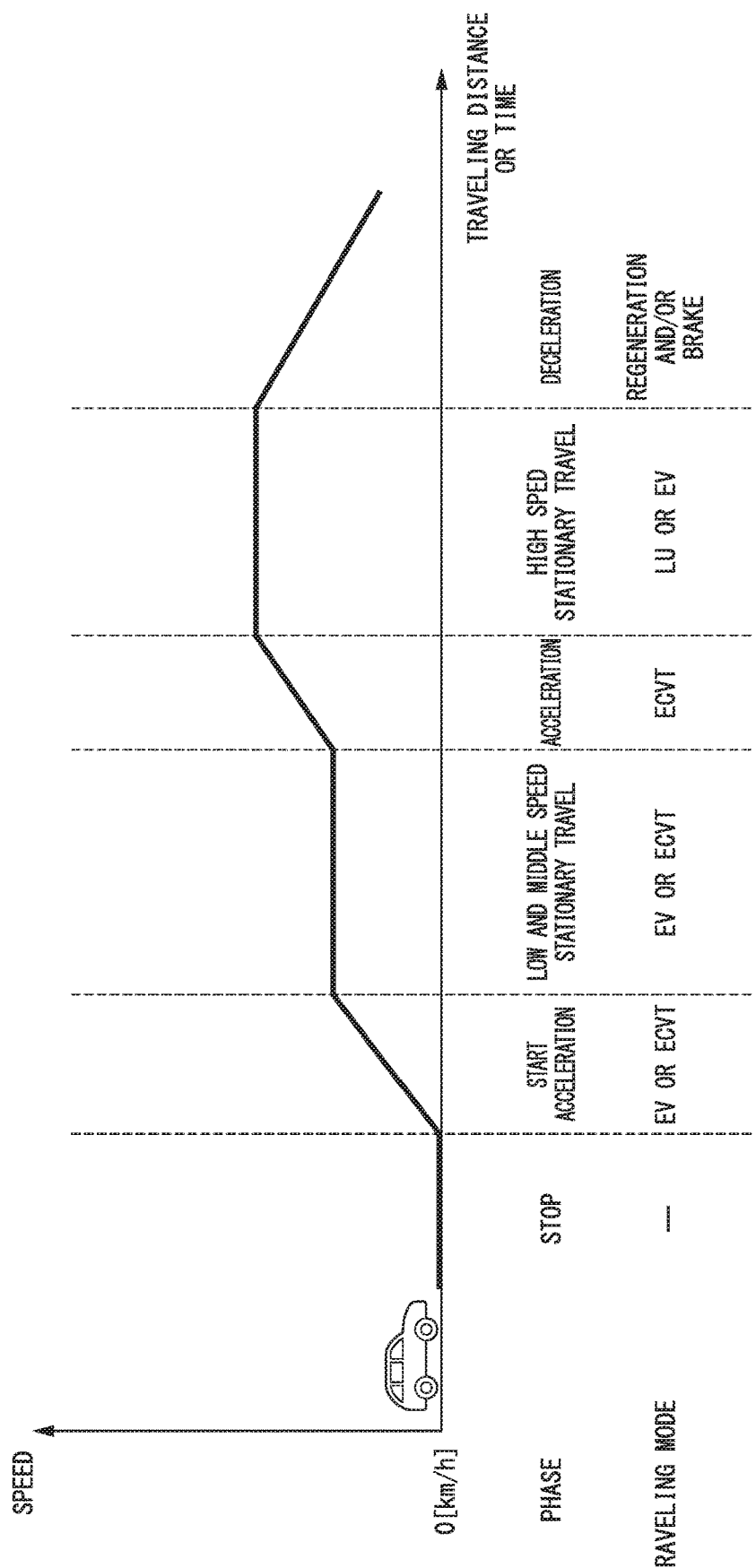
FIG. 3 is a diagram for describing switching of a traveling mode.

FIG. 3 is a diagram for describing switching of the traveling mode. In FIG. 3, the vertical axis represents speed, and the horizontal axis represents a traveling distance or time.

In starting and acceleration phases, the hybrid control unit 55 causes the vehicle to start in, for example, the EV traveling mode, and then switches between the EV traveling mode and the series hybrid traveling mode in accordance with the SOC of the battery 60.

In a low and middle-speed stationary travel phase, the hybrid control unit 55 switches, for example, between the EV traveling mode and the series hybrid traveling mode in accordance with the SOC of the battery 60. At this time, when the vehicle travels an urban area referring to map data and a position of the vehicle, a low noise EV traveling mode may be adopted.

In the acceleration phase, the hybrid control unit 55 causes the vehicle to travel, for example, in the series hybrid traveling mode. In the acceleration phase and a next high speed stationary travel phase, the hybrid control unit 55 improves output performance of the second motor 18 by causing the VCU 40 to operate and raising the voltage of the DC link DL.

In the high speed stationary travel phase, the hybrid control unit 55 switches, for example, between the engine drive traveling mode and the EV traveling mode. The engine drive traveling mode is a traveling mode adopted within a speed range in which the engine 10 can efficiently operate (for example, 60 [km/h] to 100 [km/h]). At a speed exceeding this range, the EV traveling mode is adopted in a state in which the VCU 40 is operated and the voltage of the DC link DL is raised.

In a deceleration phase, the hybrid control unit 55 performs one or both of braking by regeneration and braking by the brake device 20.

[Deceleration Control]

Figure 4:
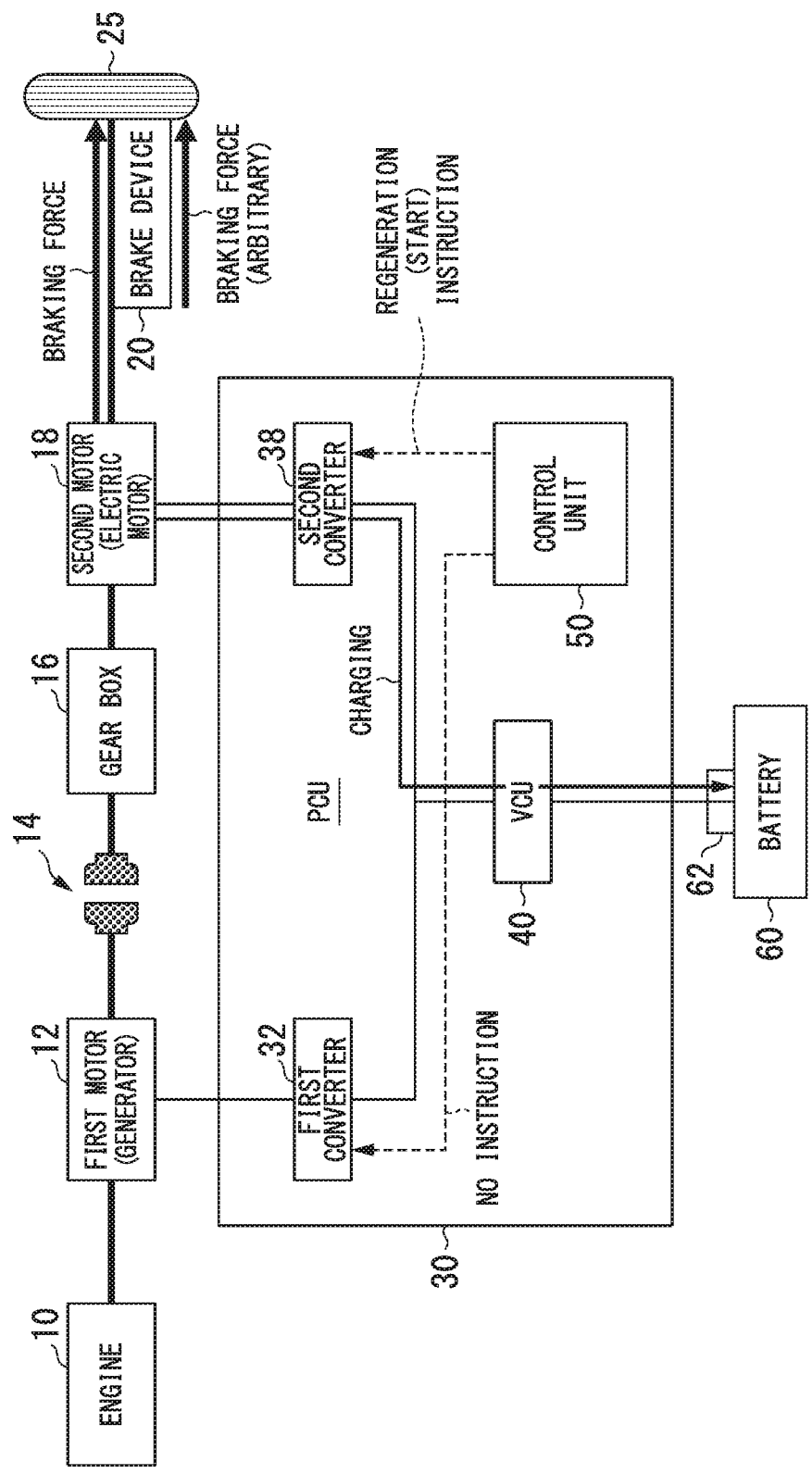
FIG. 4 is a diagram which exemplifies a pattern of deceleration control mainly executed in the vehicle.
Figure 5:
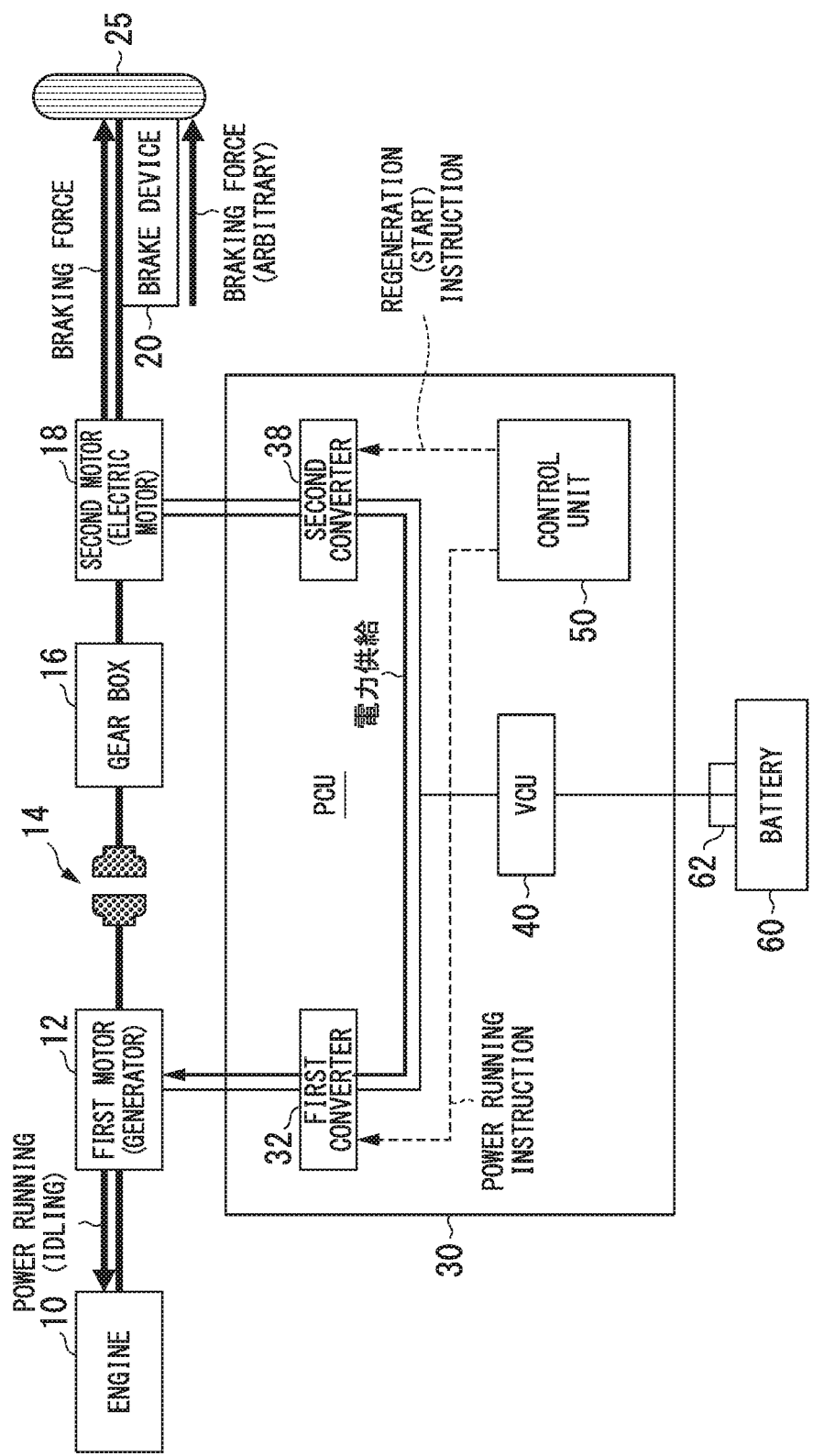
FIG. 5 is a diagram which exemplifies a pattern of deceleration control mainly executed in the vehicle.

Here, deceleration control in the vehicle will be described. FIGS. 4 and 5 are diagrams which exemplify patterns of deceleration control mainly executed in the vehicle. In the deceleration control shown in FIG. 4, the second motor 18 outputs a braking force to the drive wheel 25 while performing power generation by regeneration, and electric power generated by the second motor 18 is stored in the battery 60. The lock-up clutch 14 is kept in the separated state. At this time, the braking force may also be output to the drive wheel 25 by the brake device 20. The control unit 50 outputs an instruction for causing the second motor 18 to perform regeneration to the second converter 38, and does not output a special instruction to the first converter 32. Hereinafter, the deceleration control shown in FIG. 4 may be referred to as regeneration (charging) in some cases.

In the deceleration control shown in FIG. 5, the second motor 18 outputs a braking force to the drive wheel 25 while performing power generation by regeneration, and electric power generated by the second motor 18 is supplied to the first motor 12. The first motor 12 idles the engine 10 using the supplied electric power. The lock-up clutch 14 is kept in the separated state. At this time, a braking force may also be output to the drive wheel 25 by the brake device 20. The control unit 50 outputs an instruction for causing the second motor 18 to perform regeneration to the second converter 38, and outputs an instruction for causing the first motor 12 to idle the engine 10 to the first converter 32. In addition, fuel cut control is performed on the engine 10. Hereinafter, the deceleration control shown in FIG. 5 may be referred to as regeneration (waste electricity) in some cases. The regeneration (waste electricity) is performed when the SOC of the battery 60 is sufficiently high and no further charging is required or preferred.

In addition to the control shown in FIG. 4 or 5, control to decelerate the vehicle may be performed by only the brake device 20.

[Display Device]

Hereinafter, a display device 100 will be described. As shown in FIG. 1, the display device 100 includes a display unit 110 and a display control unit 120. The display unit 110 is realized by a liquid crystal display (LCD), an organic electroluminescence (EL) display device, a head up display (HUD), and the like. The display control unit 120 is realized, for example, by a hardware processor such as a CPU executing a program (software). In addition, the display control unit 120 may be realized by hardware such as LSI&ASIC, FPGA, and GPU (a circuit section; including circuitry), or may also be realized by cooperation of software and hardware. The display control unit 120 acquires a state of the vehicle (an operation state of a driving source) from the control unit 50, and determines a display image of the display unit 110. The display control unit 120 may be integrated into the control unit 50.

Figure 6:
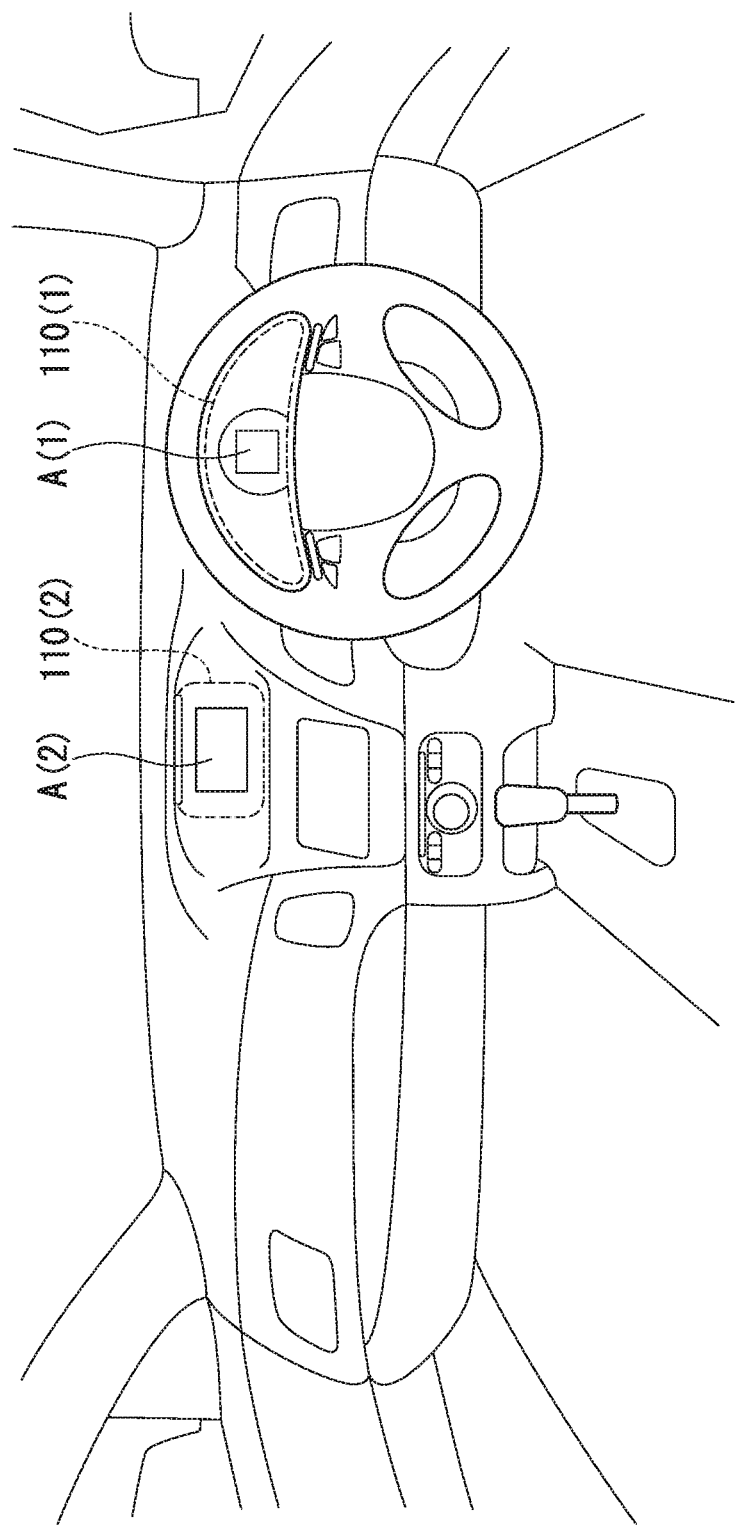
FIG. 6 is a diagram which exemplifies an attachment position of a display unit.

FIG. 6 is a diagram which exemplifies an attachment position of the display unit 110. The display unit 110 as shown in FIG. 6 may be a device (110(1) in FIG. 6) provided in a portion of an instrument panel facing a driver to perform a display including a speedometer, and may be a device (110(2) in FIG. 6) provided near a vehicle central axis of the instrument panel to display a navigation image and the like. In a former case, the display unit 110 displays an energy flow image IMEF described below, for example, in an area A (1) in the speedometer. In a latter case, the display unit 110 displays the energy flow image IMEF in an arbitrary area A (2). An attachment position of the display unit 110 is not limited to that exemplified in FIG. 4, and may be an arbitrary position.

FIGS. 7A to 11B are diagrams which exemplify a mode of the energy flow image IMEF. Configuration elements of the energy flow image IMEF include, for example, an icon Ieg indicating that the engine 10 operates, an icon Ibt indicating that the battery 60 is being charged or power is being discharged therefrom, an icon Idw indicating a drive wheel, and a flow object Fo indicating an energy flow by animation, arrows, and the like. The icon Ieg and the icon Ibt indicate whether the engine 10 operates or whether the battery 60 is being charged or power is being discharged therefrom by switching between a display state and a non-display state. The non-display state may be replaced with a "display reduced state" in which coloring or luminance is reduced to be more inconspicuous than a display state, but the display reduced state will be described as a state included in the non-display state in the following description. The icon Ieg in the display state is an example of a "predetermined image." The icon Idw indicating a drive wheel may be displayed all the time regardless of the state of the vehicle.

Figure 7A:
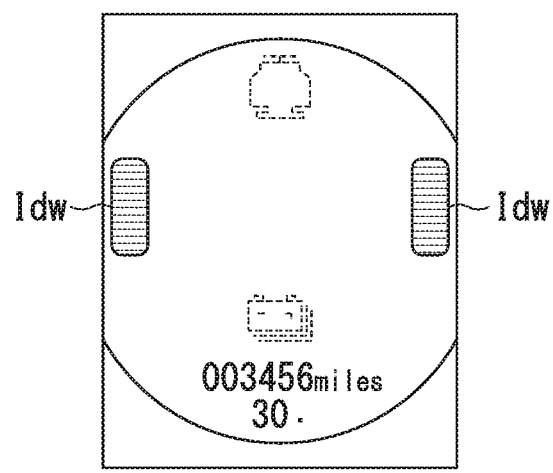
FIG. 7A is a diagram which exemplifies an energy flow image IMEF-1 which can be displayed when the vehicle is at a standstill.
Figure 7B:
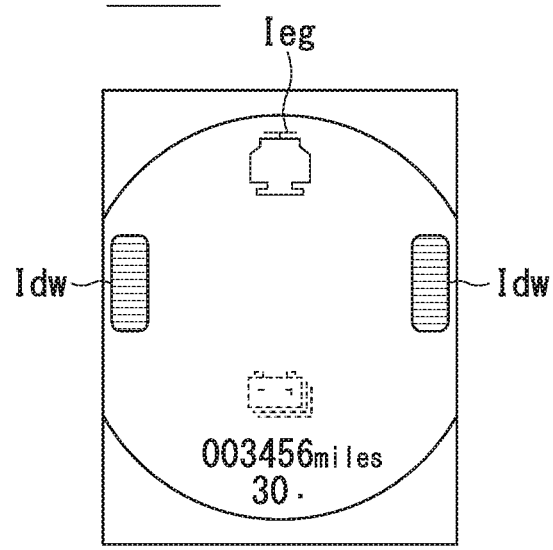
FIG. 7B is a diagram which exemplifies an energy flow image IMEF-2 which can be displayed when the vehicle is at a standstill.
Figure 7C:
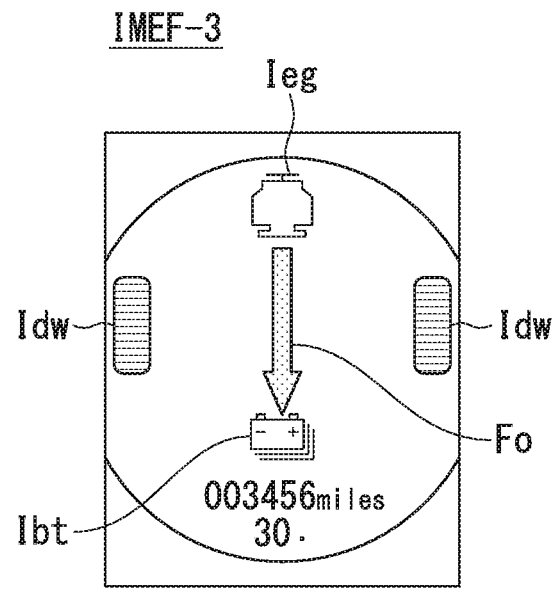
FIG. 7C is a diagram which exemplifies an energy flow image IMEF-3 which can be displayed when the vehicle is at a standstill.

FIGS. 7A to 7C are diagrams which exemplify energy flow images IMEF-1 to IMEF-3 which can be displayed when the vehicle is at a standstill. FIG. 7A shows an energy flow image IMEF-1 displayed when the vehicle is stopped and the engine 10 is inactive. In the energy flow image IMEF-1, both the icon Ieg and the icon Ibt are in the non-display state, and the flow object Fo is also not displayed.

FIG. 7B shows an energy flow image IMEF-2 displayed when any one of the first motor 12 and the second motor 18 does not perform power generation even though the vehicle is stopped and the engine 10 operates. The icon Ieg is displayed in the energy flow image IMEF-2.

FIG. 7C shows an energy flow image IMEF-3 displayed when the vehicle is stopped, the engine 10 operates, and the first motor 12 performs power generation. The icon Ieg and the icon Ibt are displayed, and further a flow object Fo heading for the icon Ibt from the icon Ieg is displayed in the energy flow image IMEF-3.

Figure 8:
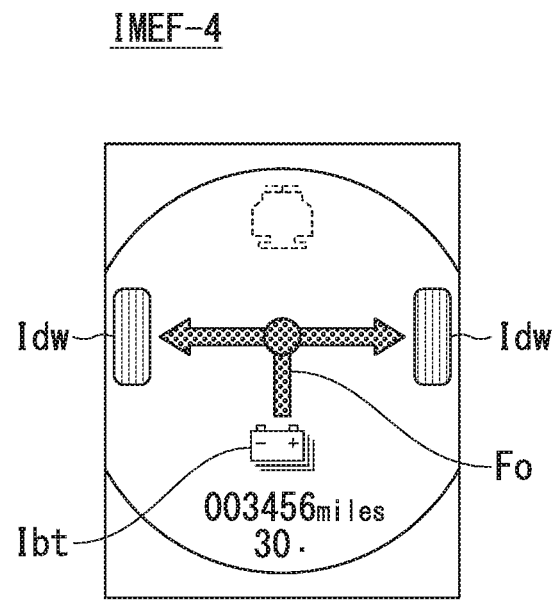
FIG. 8 is a diagram which exemplifies an energy flow image IMEF-4 displayed when the vehicle travels in an EV traveling mode.

FIG. 8 is a diagram which exemplifies an energy flow image IMEF-4 displayed when the vehicle travels in the EV traveling mode. An icon Ibt is displayed and a flow object Fo heading for an icon Idw from the icon Ibt is displayed in the energy flow image IMEF-4.

Figure 9A:
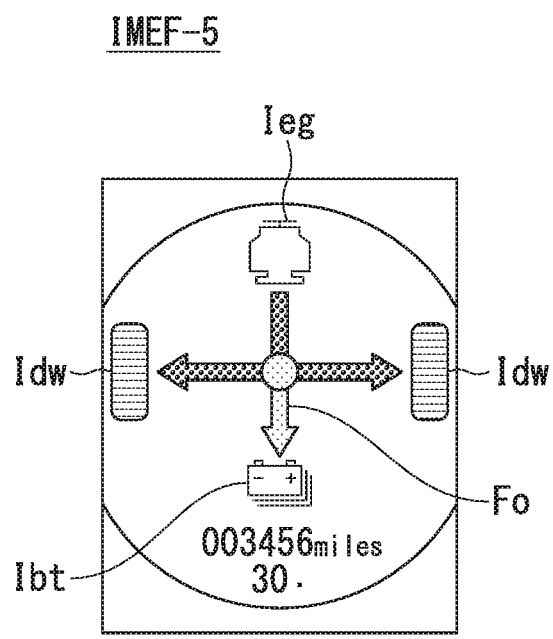
FIG. 9A is a diagram which exemplifies an energy flow image IMEF-5 displayed when the vehicle travels in a series hybrid traveling mode.
Figure 9B:
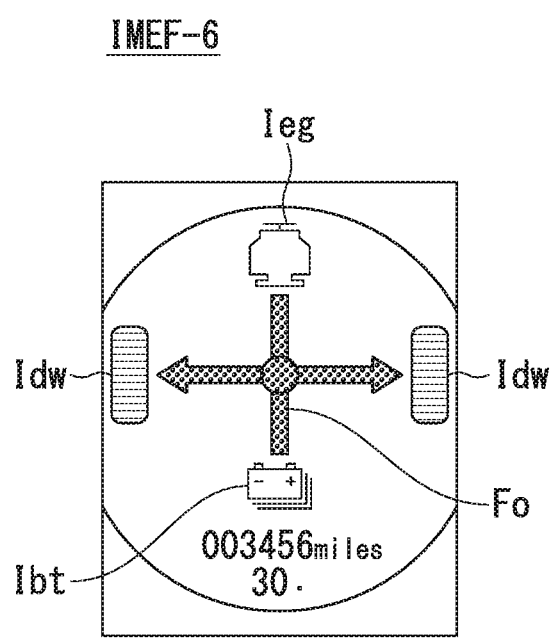
FIG. 9B is a diagram which exemplifies an energy flow image IMEF-6 displayed when the vehicle travels in the series hybrid traveling mode.
Figure 9C:
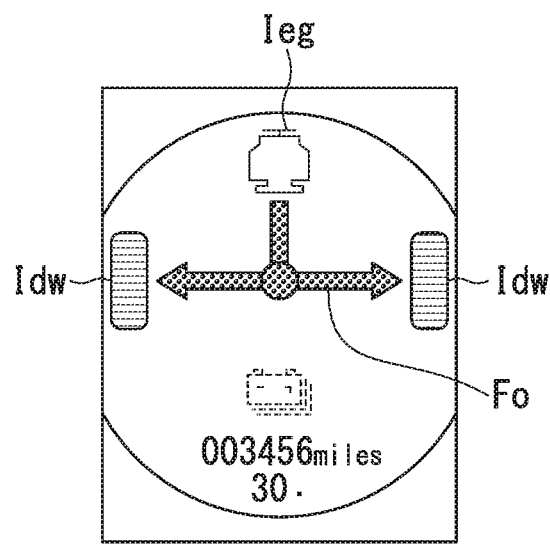
FIG. 9C is a diagram which exemplifies an energy flow image IMEF-7 displayed when the vehicle travels in the series hybrid traveling mode.

FIGS. 9A to 9C are diagrams which exemplify energy flow images IMEF-5 to IMEF-7 displayed when the vehicle travels in the series hybrid traveling mode. FIG. 9A shows an energy flow image IMEF-5 displayed when the vehicle travels in the series hybrid traveling mode and the battery 60 is charged. In the energy flow image IMEF-5, the icon Ieg and the icon Ibt are displayed, and a flow object Fo heading for the icon Ibt and the icon Idw from the icon Ieg is displayed. This state is generated when the power output by the engine 10 exceeds an energy sum of power output to the drive wheel DW and consumed power of an auxiliary device such as an air conditioner.

FIG. 9B shows an energy flow image IMEF-6 displayed when the vehicle travels in the series hybrid traveling mode and electric power is supplied to the DC link DL from the battery 60. In the energy flow image IMEF-6, the icon Ieg and the icon Ibt are displayed and a flow object Fo heading for the icon Idw from the icon Ieg and the icon Ibt is displayed. This state is generated when the power output by the engine 10 is lower than the energy sum of power output to the drive wheel DW and consumed power of an auxiliary device such as an air conditioner.

FIG. 9C shows an energy flow image IMEF-7 displayed when the vehicle travels in the series hybrid traveling mode and the battery 60 is not charged or power is not discharged therefrom. In the energy flow image IMEF-7, the icon Ieg is displayed, and a flow object Fo heading for the icon Idw from the icon Ieg is displayed. This state is generated when the power output by the engine 10 coincides with the energy sum of power output to the drive wheel DW and consumed power of an auxiliary device such as an air conditioner.

Figure 10A:
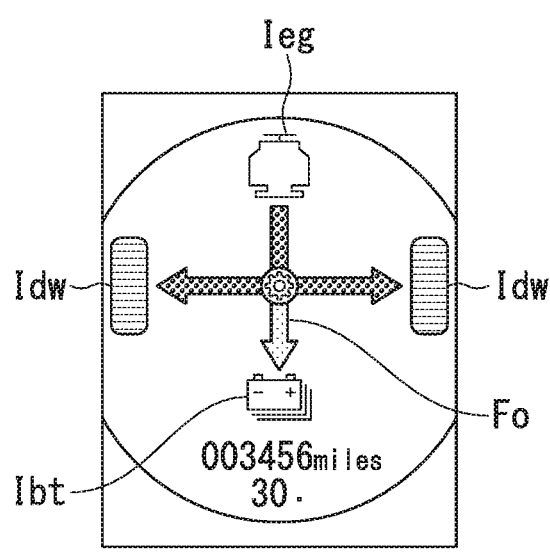
FIG. 10A is a diagram which exemplifies an energy flow image IMEF-8 displayed when the vehicle travels in an engine drive traveling mode.
Figure 10B:
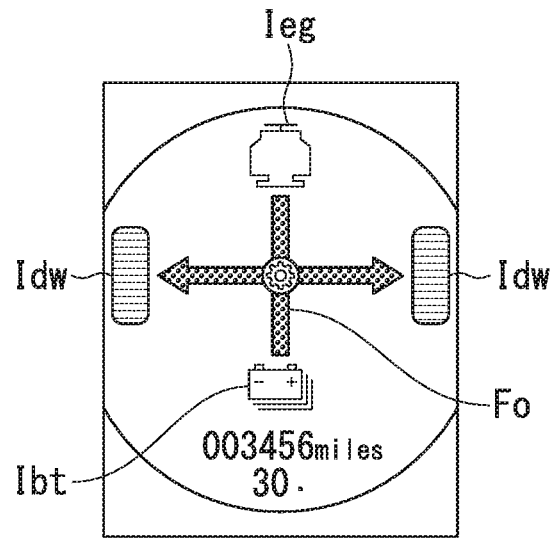
FIG. 10B is a diagram which exemplifies an energy flow image IMEF-9 displayed when the vehicle travels in the engine drive traveling mode.
Figure 10C:
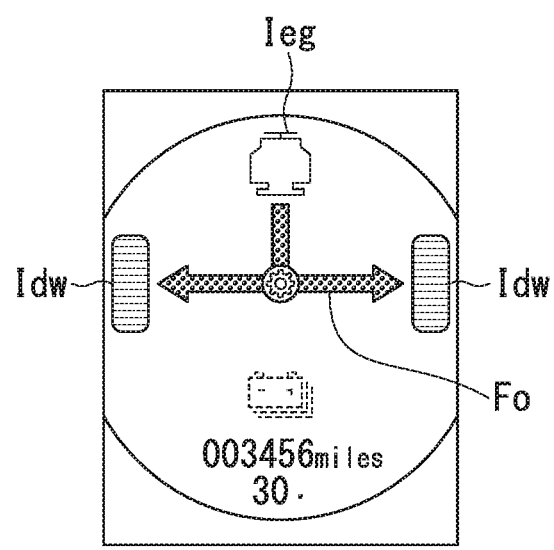
FIG. 10C is a diagram which exemplifies an energy flow image IMEF-10 displayed when the vehicle travels in the engine drive traveling mode.

FIGS. 10A to 10C are diagrams which exemplify an energy flow images IMEF-8 to IMEF-10 displayed when the vehicle travels in the engine drive traveling mode. FIG. 10A shows an energy flow image IMEF-8 displayed when the vehicle travels in the engine drive traveling mode and the battery 60 is charged. In the energy flow image IMEF-8, the icon Ieg and the icon Ibt are displayed, and the flow object Fo heading for the icon Ibt and the icon Idw from the icon Ieg is displayed. This state is generated when the power output by the engine 10 exceeds an energy sum of power output to the drive wheel DW and consumed power of an auxiliary device such as an air conditioner.

FIG. 10B shows an energy flow image IMEF-9 displayed when the vehicle travels in the engine drive traveling mode and electric power is supplied to the DC link DL from the battery 60. In the energy flow image IMEF-9, the icon Ieg and the icon Ibt are displayed, and the flow object Fo heading for the icon Idw from the icon Ieg and the icon Ibt is displayed. This state is generated when the power output by the engine 10 is lower than an energy sum of power output to the drive wheel DW and the consumed power of an auxiliary device such as an air conditioner.

FIG. 10C shows an energy flow image IMEF-10 displayed when the vehicle travels in the engine drive traveling mode and the battery 60 is not charged or power is not discharged therefrom. In the energy flow image IMEF-10, the icon Ieg is displayed, and the flow object Fo heading for the icon Idw from the icon Ieg is displayed. This state is generated when the power output by the engine 10 coincides with an energy sum of power output to the drive wheel DW and consumed power of an auxiliary device such as an air conditioner.

Figure 11A:
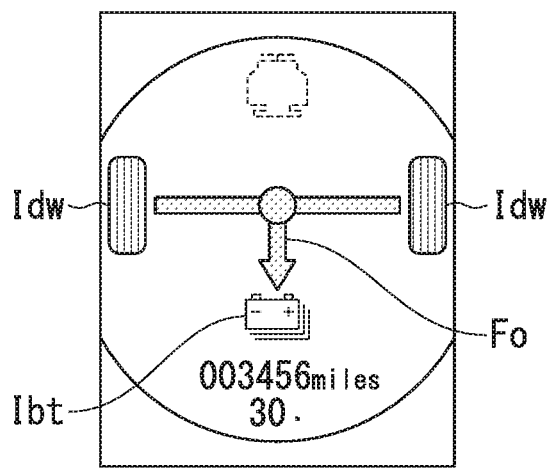
FIG. 11A is a diagram which exemplifies an energy flow image IMEF-11 displayed when the vehicle decelerates due to regeneration.
Figure 11B:
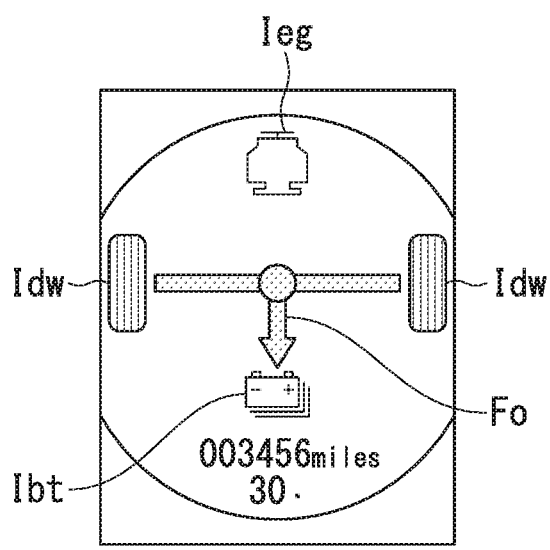
FIG. 11B is a diagram which exemplifies an energy flow image IMEF-12 displayed when the vehicle decelerates due to regeneration.

FIGS. 11A to 11B are diagrams which exemplify energy flow images IMEF-11 and IMEF-12 displayed when the vehicle decelerates due to regeneration. FIG. 11A shows an energy flow image IMEF-11 displayed when regeneration is performed and an operation request of the engine 10 does not occur. In the energy flow image IMEF-11, the icon Ibt is displayed and a flow object Fo heading for the icon Ibt from the icon Idw is displayed.

FIG. 11B shows an energy flow image IMEF-12 displayed when regeneration is performed and an operation request for the engine 10 occurs. In the energy flow image IMEF-12, the icon Ieg and the icon Ibt are displayed and the flow object Fo heading for the icon Ibt from the icon Idw is displayed.

[Energy Flow Image IMEF-12]

Hereinafter, significance of the energy flow image IMEF-12 will be described. First, an operation request of the engine 10 related to this will be described. An operation request of the engine 10 may be an event occurring inside the control unit 50, and may also be an instruction signal given to a control device of the engine 10. In the former case, for example, flag information indicating whether an operation request of the engine 10 occurs is written in a predetermined region in a memory of the control unit 50 by the hybrid control unit 55, and the engine control unit 51 processes control of the engine 10 with reference to the flag information.

An operation request of the engine 10 occurs, for example, in the following cases.

(1) A case in which electric power supplied from the battery 60 is not sufficient for electric power for traveling or driving an auxiliary device, or the SOC of the battery 60 is too low.

(2) A case in which a temperature of the second motor 18 exceeds a reference temperature.

(3) A case in which a non-operation time of the engine 10 exceeds a reference time.

(4) A case in which it is necessary to cause the engine 10 to operate for periodic self-diagnosis.

Although (1) among the above cases occurs primarily due to an acceleration pedal operation of a driver, (2) to (4) occur due to circumstances on the vehicle side. For this reason, the operation request of the engine 10 may continue regardless of whether the vehicle accelerates or decelerates in some cases.

Here, if the vehicle travels on a road and the like with many gradient changes, it is assumed that a state will occur in which an acceleration instruction and a deceleration instruction are repeated in the vehicle. When this state occurs in the EV traveling mode in which the operation request of the engine 10 does not occur, a problem noted by the display device 100 of the present embodiment with respect to a display of the energy flow image IMEF does not occur. On the other hand, when the state described above occurs when the operation request of the engine 10 occurs (typically, in the series hybrid traveling mode or the engine drive traveling mode, but when the engine 10 is operated for periodic self-diagnosis in the EV traveling mode can be also included), a problem such as flickering of the icon Ieg can occur. This problem is likely to occur especially when regeneration (waste electricity) is performed.

On the other hand, in the display device 100 of the present embodiment, when the display control unit 120 causes the display unit 110 to display the icon Ieg regardless of the operation state of the engine 10 when regeneration by the second motor 18 is performed and the operation request of the engine 10 occurs. As an example, the energy flow image IMEF-12 is displayed instead of the energy flow image IMEF-11. As a result, it is possible to suppress flickering of the icon Ieg.

In order to realize the control described above, when the operation state of the vehicle is switched to the regeneration (waste electricity) or the regeneration (charging) instead of referring to information indicating whether the operation request of the engine 10 occurs, the display control unit 120 may determine which of the energy flow images IMEF-11 and IMEF-12 to display on the basis of whether an immediately preceding state is a state in which the engine 10 operates due to fuel injection. In this case, the display control unit 120 causes the display unit 110 to display the energy flow image IMEF-11 when an immediately preceding state is not the state in which the engine 10 operates due to fuel injection, and causes the display unit 110 to display the energy flow image IMEF-12 when an immediately preceding state is the state in which the engine 10 operates due to fuel injection.

The processing described above is applied only when the regeneration (waste electricity) is performed, and, when the regeneration (charging) is performed, the energy flow image IMEF-11 may be displayed instead of the energy flow image IMEF-12 although an operation request of the engine 10 has occurred.

FIG. 12 is a diagram which shows changes in display state when an acceleration instruction and a deceleration instruction are repeated in the EV traveling mode in which an operation request of an engine 10 does not occur. In FIG. 12, regeneration (waste electricity) is performed in an accelerator pedal off period. In a case shown in FIG. 12, the energy flow images IMEF-4 and IMEF11 are alternately displayed. Since the icon Ieg is not displayed in any of the energy flow image IMEF-4 and IMEF-11, flickering of the icon Ieg does not occur. The icon Ieg is displayed when the engine 10 operates with fuel consumption. Therefore, although the engine 10 performs idling when the operation request of the engine 10 does not occur, the icon Ieg is not displayed.

Figure 13:
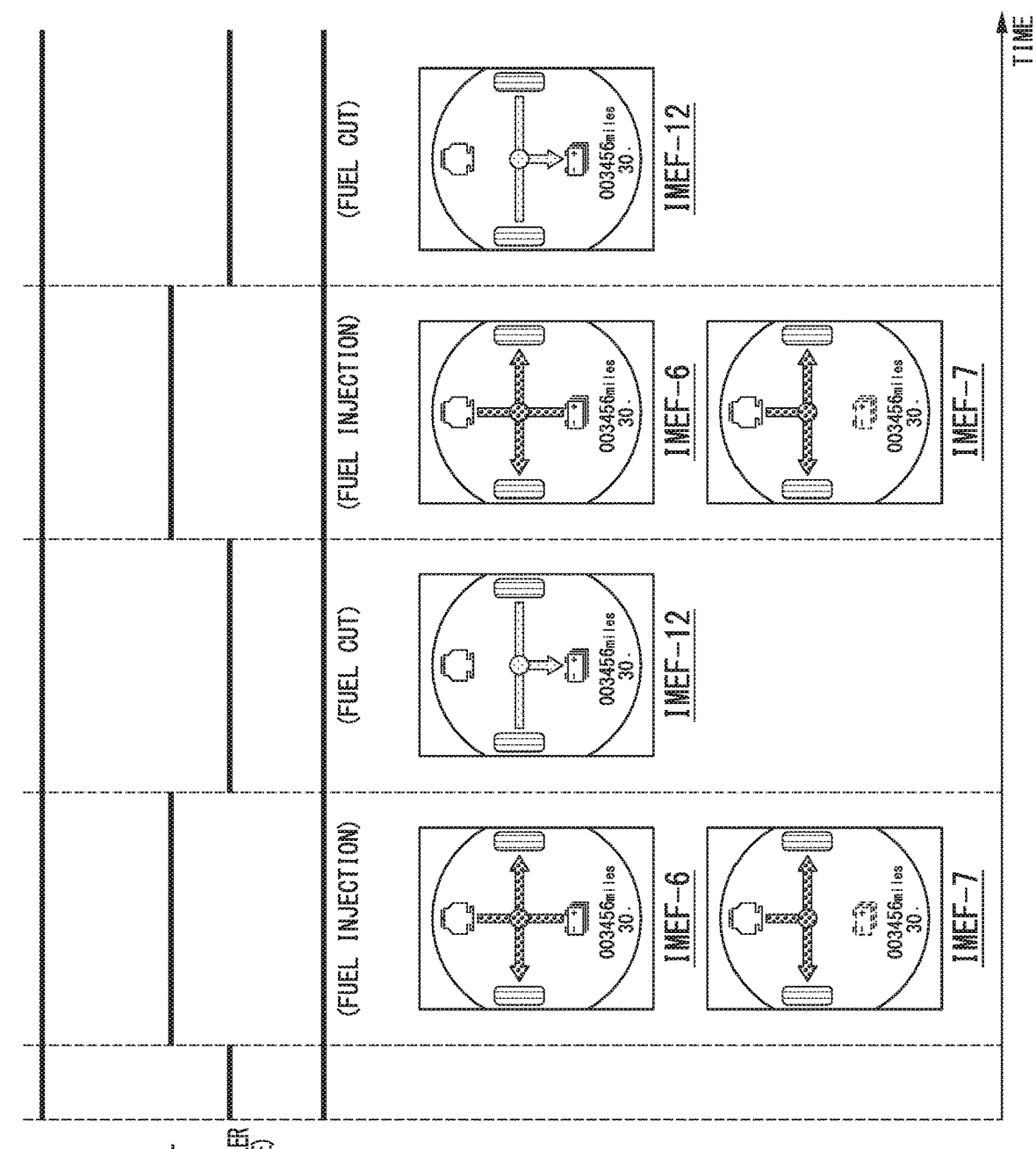
FIG. 13 is a diagram which shows changes in display state when the acceleration instruction and the deceleration instruction are repeated in a case in which an operation request of an engine occurs.

FIG. 13 is a diagram which shows changes in display state when the acceleration instruction and the deceleration instruction are repeated in a case in which the operation request of an engine 10 occurs. In FIG. 13, the regeneration (waste electricity) is performed in a period of accelerator pedal off. In a case shown in FIG. 13, the energy flow image IMEF-6 or IMEF-7 and IMEF-12 are alternately displayed. Since the icon Ieg is displayed in both of the energy flow image IMEF-6 or IMEF-7 and IMEF-12, flickering of the icon Ieg does not occur. The icon Ieg is displayed when the engine 10 operates with fuel consumption in principle, but, since the flickering of the icon Ieg occurs if the icon Ieg is set to the non-display whenever the regeneration (waste electricity) occurs in a case in which the operation request of the engine 10 does not occur, the display device 100 of the embodiment suppresses the flickering of the icon Ieg by exceptionally preparing the energy flow image IMEF-12. If the operation request of the engine 10 disappears while the energy flow image IMEF-12 is displayed, it may be determined whether to switch from the energy flow image IMEF-12 to the energy flow image IMEF-11 on the basis of the operation state of the engine 10.

Figure 14:
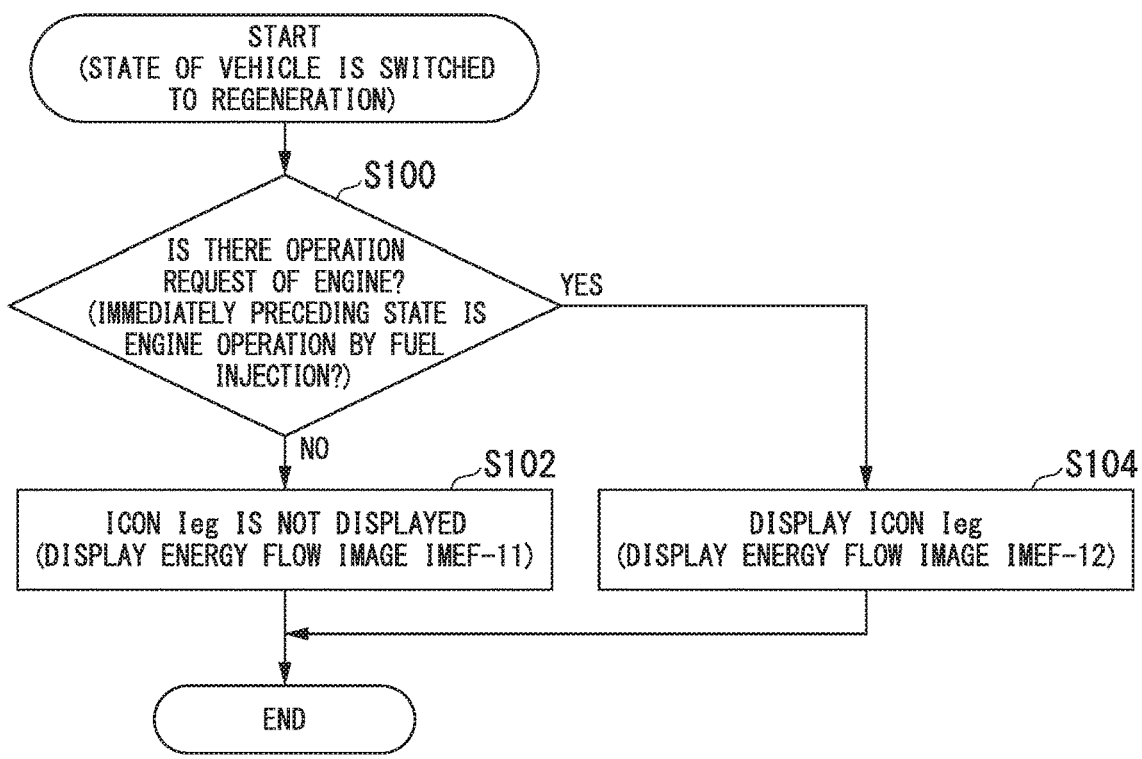
FIG. 14 is a flowchart which shows an example of a flow of processing executed by a display control unit when which one of the energy flow images IMEF-11 and IMEF-12 to display is determined.

FIG. 14 is a flowchart which shows an example of a flow of processing executed by a display control unit 120 when which one of the energy flow images IMEF-11 and IMEF-12 to display is determined. The processing of the present flowchart is started when a vehicle state is switched to regeneration.

First, the display control unit 120 determines whether the operation request of the engine 10 occurs (step S100). When the operation request of the engine 10 does not occur, the display control unit 120 does not cause the display unit 110 to display the icon Ieg (step S102). That is, the display control unit 120 causes the display unit 110 to display the energy flow image IMEF-11. The determination processing of step S100 may be used to determine whether the immediately preceding state of the vehicle is a state in which the engine 10 operates due to fuel injection.

On the other hand, when an operation request of the engine 10 occurs, the display control unit 120 causes the display unit 110 to display the icon Ieg (step S104). That is, the display control unit 120 causes the display unit 110 to display the energy flow image IMEF-12.

Figure 15:
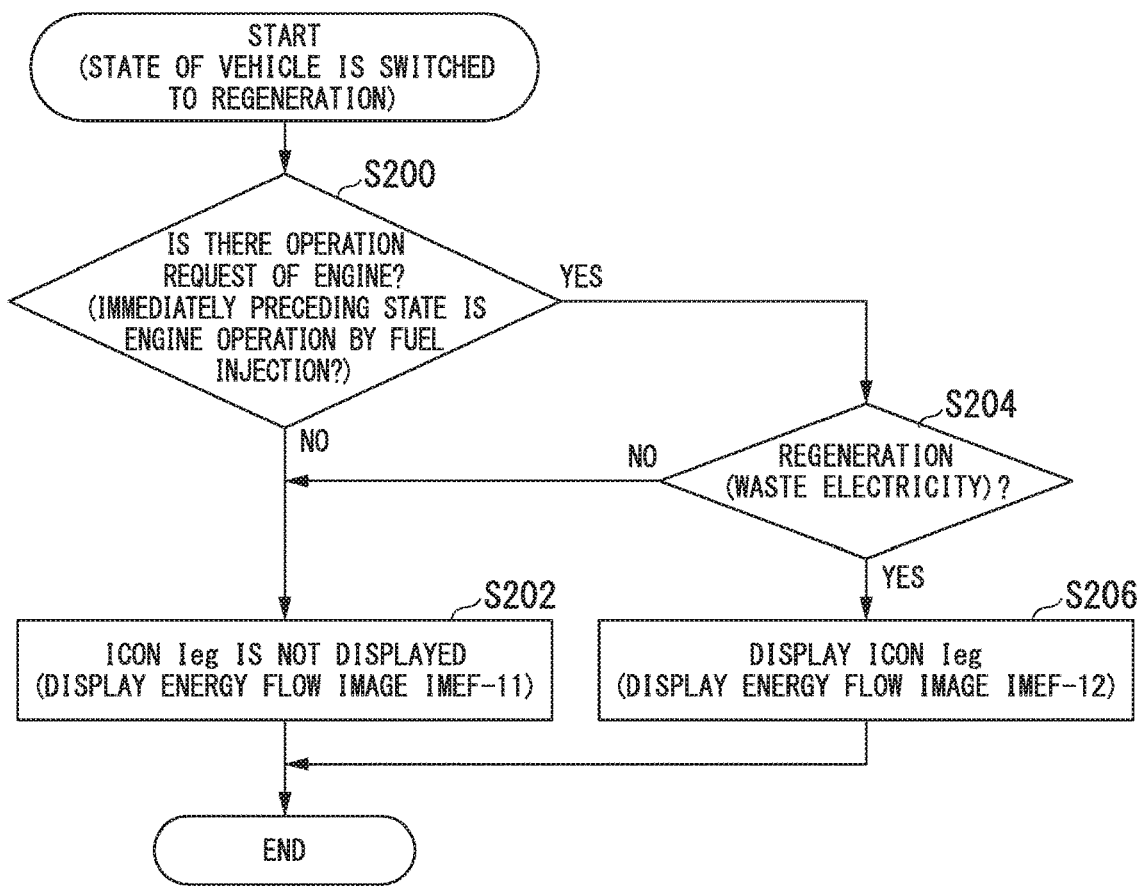
FIG. 15 is a flowchart which shows another example of the flow of processing executed by a display control unit when which one of the energy flow images IMEF-11 and IMEF-12 to display is determined.

The display control unit 120 may also perform processing of a flowchart shown in FIG. 15 instead of the processing of the flowchart shown in FIG. 14. FIG. 15 is a flowchart which shows another example of the flow of processing executed by the display control unit 120 when which one of the energy flow images IMEF-11 and IMEF-12 to display is determined. The processing of the present flowchart starts when the state of the vehicle is switched to regeneration.

First, the display control unit 120 determines whether the operation request of the engine 10 occurs (step S200). When the operation request of the engine 10 does not occur, the display control unit 120 does not cause the display unit 110 to display the icon Ieg (step S202). That is, the display control unit 120 causes the display unit 110 to display the energy flow image IMEF-11. The determination processing in step S200 may be used to determine whether the immediately preceding state of the vehicle is a state in which the engine 10 operates due to fuel injection.

On the other hand, when the operation request of the engine 10 occurs, the display control unit 120 determines whether the vehicle is in a state of performing regeneration (waste electricity) (step S204). When the vehicle does not perform regeneration (waste electricity), that is, regeneration (charging) is not performed, the display control unit 120 does not cause the display unit 110 to display the icon Ieg (step S202). When the vehicle performs regeneration (waste electricity), the display control unit 120 causes the display unit 110 to display the icon Ieg (step S206). That is, the display control unit 120 causes the display unit 110 to display the energy flow image IMEF-12.

According to the display device 100 of the embodiments described above, when the display control unit 120 performs regeneration using the second motor 18 and an operation request for causing the engine 10 to operate occurs, it is possible to suppress occurrence of image flickering by causing the display unit 110 to display the icon Ieg regardless of an operation state of the engine 10.

In another aspect, according to the display device 100 of the embodiments, it is possible to suppress occurrence of image flickering by the display control unit 120 determining whether to cause the display unit 110 to continue displaying of the icon Ieg, when an operation state of a driving source is switched, in accordance with the operation state of a driving source at least immediately before the switching.

The embodiments described above can be expressed as follows.

(A)

A display control method for controlling a display unit which is mounted on a vehicle including an engine and an electric motor connected to a drive wheel and is capable of displaying a predetermined image indicating that the engine operates, the method includes causing the display unit to display the predetermined image when the engine operates with fuel consumption, and causing the display unit to display the predetermined image regardless of an operation state of the engine when regeneration by the electric motor is performed and an operation request for causing the engine to operate occurs.

(B)

A program for causing a computer to control a display unit which is mounted on the vehicle including an engine, and an electric motor connected to a drive wheel and is capable of displaying a predetermined image indicating that the engine operates, the program causes the computer to execute processing of causing the display unit to display the predetermined image when the engine operates with fuel consumption, and processing of causing the display unit to display the predetermined image regardless of an operation state of the engine when regeneration by the electric motor is performed and an operation request for causing the engine to operate occurs.

(C)

A display control method of controlling a display unit that is mounted on a vehicle and is capable of displaying a predetermined image indicating that at least one driving source of the vehicle operates, the method include determining whether to cause the display unit to display the predetermined image in accordance with an operation state of the driving source, and determining, when the operation state of the driving source is switched, whether to cause the display unit to continue displaying the predetermined image in accordance with an operation state of the driving source at least immediately before the switching.

(D)

A program for causing a computer to control a display unit that is mounted on a vehicle and is capable of displaying a predetermined image indicating that at least one driving source of the vehicle operates, the program causes the computer to execute processing of determining whether to cause the display unit to display the predetermined image in accordance with the operation state of the driving source, and processing of determining, when the operation state of the driving source is switched, whether to cause the display unit to continue displaying the predetermined image in accordance with an operation state of the driving source at least immediately before the switching.

Although aspects of the present invention have been described with reference to embodiments, the present invention is not limited to these embodiments, and various modifications and substitutions can be made within a range not departing from the gist of the present invention.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description and is only limited by the scope of the appended claims.

What is claimed is:

1. A display device mounted on a vehicle including an engine, and an electric motor connected to a drive wheel, the display device comprising:
    a display unit that displays an image determined by a display control unit; and
    the display control unit configured to cause the display unit to display, when the engine operates with fuel consumption, an engine operation image indicating that the engine operates,
    wherein, in response to the regeneration by the electric motor being performed and the operation request for causing the engine to operate occurring, the display control unit causes the display unit to display the engine operation image regardless of presence or absence of fuel consumption by the engine; and
    wherein, in response to an operation request for causing the engine to operate ceasing to occur while the engine operation image is displayed on the display unit, the display control unit determines whether or not to stop causing the display unit to display the engine operation image based on the operation state of the engine.

2. The display device according to claim 1,
    wherein the operation request includes an operation request other than an operation request based on an operation for an operator receiving an acceleration instruction from a driver.

3. The display device according to claim 1,
    wherein the vehicle further comprises a generator connected to the engine, and
    wherein, when regeneration by the electric motor is performed, an operation request for causing the engine to operate occurs, and regeneration electric power by the electric motor is consumed by the generator causing the engine to operate without depending on fuel, the display control unit causes the display unit to display the engine operation image.

4. A display device comprising:
    a display unit which is mounted on a vehicle and which displays an image determined by a display control unit; and
    the display control unit configured to determine whether or not to cause the display unit to display, in accordance with an operation state of at least one driving source of the vehicle, a driving source operation image indicating that the driving source operates,
    wherein, in response to the operation state of the driving source being switched, the display control unit determines whether or not to cause the display unit to continue displaying the driving source operation image in accordance with an operation state of the driving source at least immediately before the switching,
    wherein the driving source includes an engine, an electric motor connected to a drive wheel, a generator connected to the engine, and a battery,
    the driving source operation image is an image indicating that the engine operates,
    the operation state of the driving source includes:
        a first state in which the engine operates with fuel consumption,
        a second state in which the engine stops and regeneration electric power by the electric motor is stored in the battery, and
        a third state in which the engine stops and regeneration electric power by the electric motor is consumed by the generator causing the engine to operate without depending on fuel, and wherein, when the operation state of the driving source is switched among the first state, the second state, and the third state, the display control unit determines whether or not to cause the display unit to continue displaying the driving source operation image in accordance with an operation state of the driving source at least immediately before the switching.

5. The display device according to claim 4,
wherein, when the operation state of the driving source is switched from the first state to the third state, the display control unit causes the display unit to continue displaying the driving source operation image.

6. The display device according to claim 4,
wherein, when the operation state of the driving source is switched from the second state to the third state, the display control unit causes the display unit to continue a state of not displaying the driving source operation image.

* * * * *